United States Patent
Nishimura et al.

(10) Patent No.: US 12,265,930 B2
(45) Date of Patent: Apr. 1, 2025

(54) WORK ESTIMATION APPARATUS, WORK ESTIMATION METHOD, AND NON-TRANSITORY COMPUTER-READABLE STORAGE MEDIUM

(71) Applicant: KABUSHIKI KAISHA TOSHIBA, Tokyo (JP)

(72) Inventors: Keisuke Nishimura, Fujisawa (JP); Atsushi Wada, Shiraoka (JP); Masatoshi Takano, Yokohama (JP); Yuta Shirakawa, Kawasaki (JP); Yojiro Tonouchi, Inagi (JP); Shojun Nakayama, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 358 days.

(21) Appl. No.: 17/653,931

(22) Filed: Mar. 8, 2022

(65) Prior Publication Data

US 2023/0103948 A1 Apr. 6, 2023

(30) Foreign Application Priority Data

Sep. 22, 2021 (JP) ................. 2021-154586

(51) Int. Cl.
| | |
|---|---|
| *G06T 7/70* | (2017.01) |
| *G06Q 10/06* | (2023.01) |
| *G06Q 10/0631* | (2023.01) |
| *G06Q 10/0639* | (2023.01) |
| *G06Q 10/067* | (2023.01) |

(Continued)

(52) U.S. Cl.
CPC ............... *G06Q 10/063114* (2013.01); *G06Q 10/06398* (2013.01); *G06T 7/73* (2017.01); *G06T 11/206* (2013.01); *G06T 2207/10016* (2013.01); *G06T 2207/20081* (2013.01); *G06T 2207/30196* (2013.01)

(58) Field of Classification Search
USPC ...... 382/103–225; 705/7.11–7.42; 706/1–62, 706/900–907, 909, 912, 926
See application file for complete search history.

(56) References Cited

U.S. PATENT DOCUMENTS

| | | | |
|---|---|---|---|
| 11,687,849 B2 * | 6/2023 | Abe ...................... | G10L 17/00 |
| | | | 705/7.14 |
| 2009/0296990 A1 | 12/2009 | Holland et al. | |

(Continued)

FOREIGN PATENT DOCUMENTS

| | | |
|---|---|---|
| JP | 2015-213491 A | 12/2015 |
| JP | 2017-80197 A | 5/2017 |

(Continued)

OTHER PUBLICATIONS

Chikatsu Hirobumi; Motion Analyzer;2001 (Year: 2001).*

(Continued)

*Primary Examiner* — Marcellus J Augustin
(74) *Attorney, Agent, or Firm* — Oblon, McClelland, Maier & Neustadt, L.L.P.

(57) ABSTRACT

According to one embodiment, a work estimation apparatus includes processing circuitry. The processing circuitry acquires video data on a predetermined area, estimates a work state of a worker included in the video data based on the video data, and outputs display data including a graph related to the work state.

29 Claims, 13 Drawing Sheets

(51) Int. Cl.
  *G06T 7/73* (2017.01)
  *G06T 11/20* (2006.01)

(56) References Cited

U.S. PATENT DOCUMENTS

| | | | | |
|---|---|---|---|---|
| 2018/0174090 A1* | 6/2018 | Sang | ............... | G06Q 10/067 |
| 2018/0190145 A1* | 7/2018 | Nakayama | ............... | G09B 5/02 |
| 2018/0190147 A1* | 7/2018 | Chapela | ............... | A61B 5/486 |
| 2018/0285802 A1* | 10/2018 | Lewis | ............... | G06Q 10/06398 |
| 2020/0160047 A1* | 5/2020 | Nishi | ............... | G06F 18/22 |
| 2022/0083769 A1* | 3/2022 | Nakayama | ............... | G06T 7/73 |

FOREIGN PATENT DOCUMENTS

| | | |
|---|---|---|
| JP | 2017-80202 A | 5/2017 |
| JP | 2018-109880 A | 7/2018 |
| JP | 2020-21 451 A | 2/2020 |
| JP | 2020-86697 A | 6/2020 |
| JP | 2020-129287 A | 8/2020 |
| JP | 2020-201772 A | 12/2020 |
| JP | 2021-125183 A | 8/2021 |
| JP | 2022-48017 A | 3/2022 |
| WO | WO 2020/250501 A1 | 12/2020 |

OTHER PUBLICATIONS

Sōngxià yángzhī; Display Program, Display Method and Display Device; 2020 (Year: 2020).*
Japanese Office Action issued Sep. 24, 2024 in Japanese Application 2021-154586, (with unedited computer-generated English translation), 8 pages.

* cited by examiner

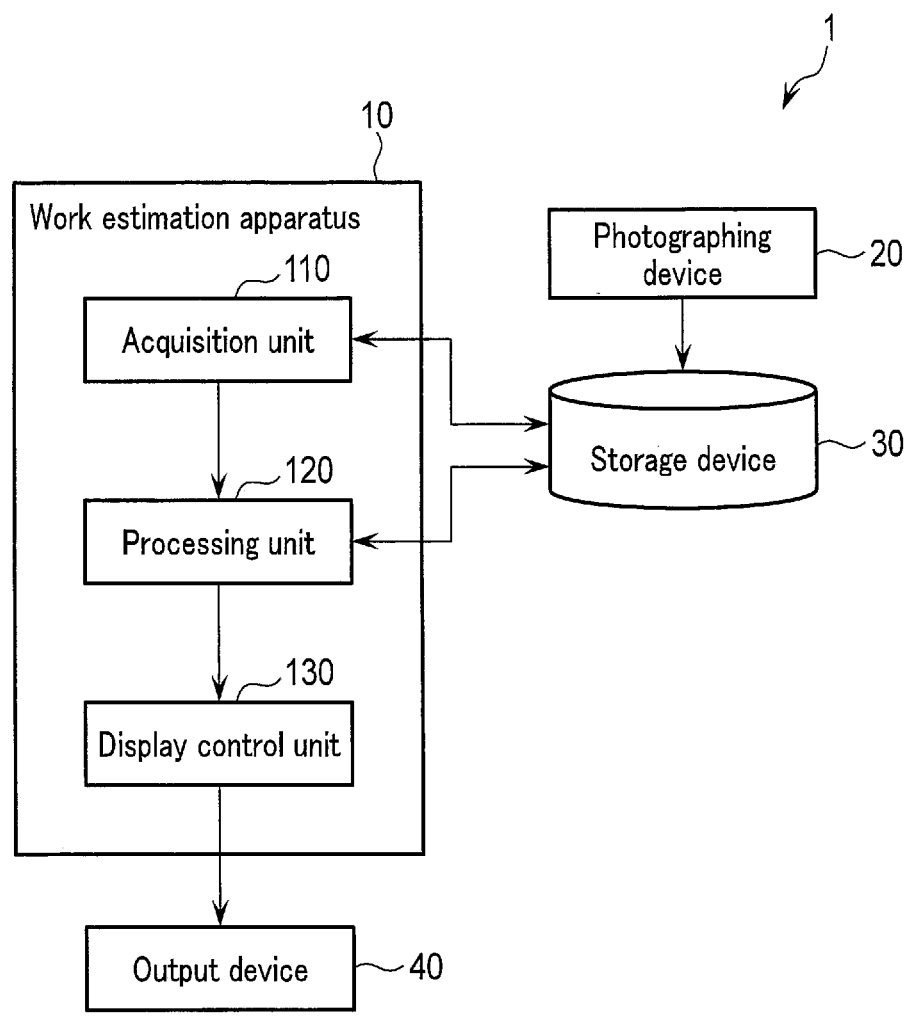
F I G. 1

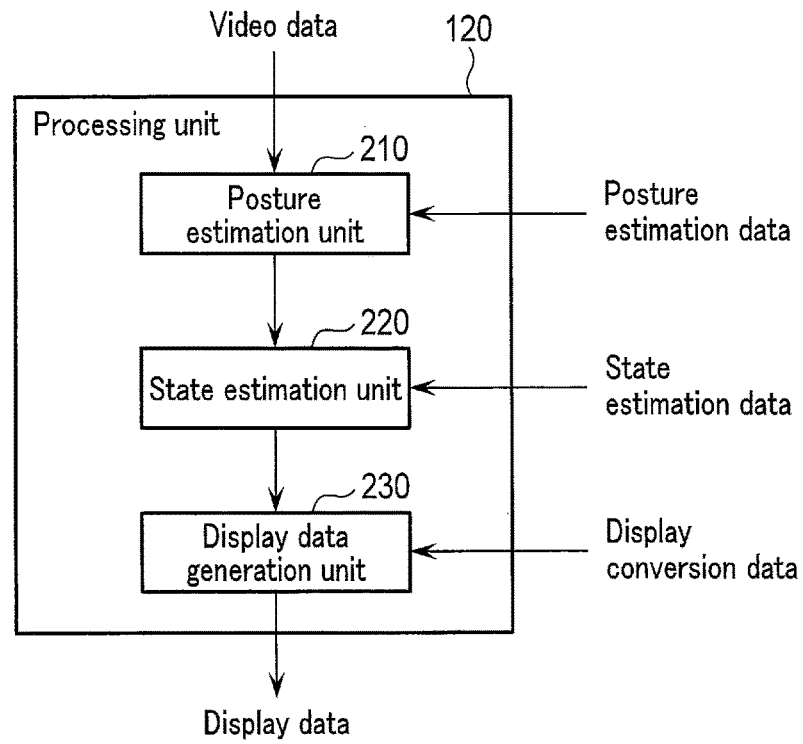
F I G. 2
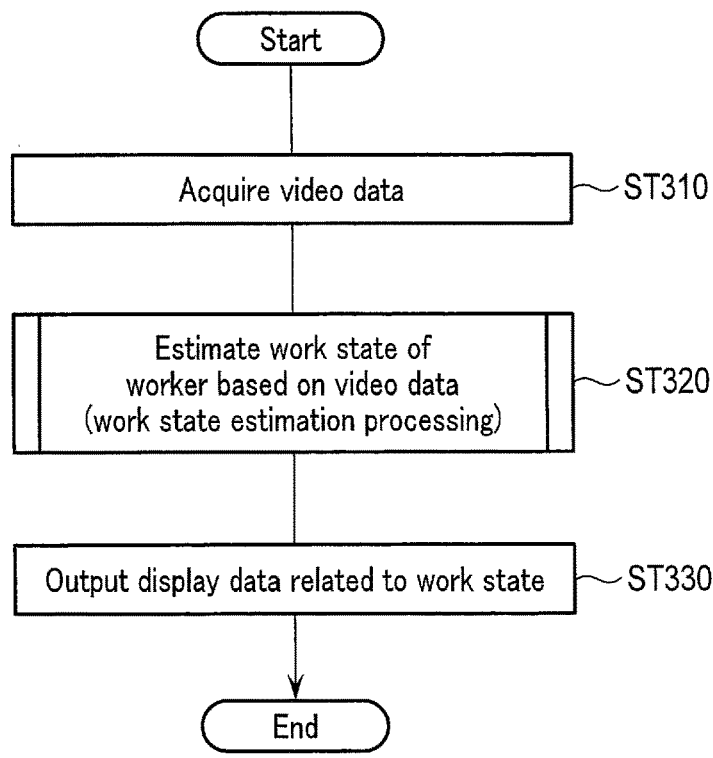
F I G. 3

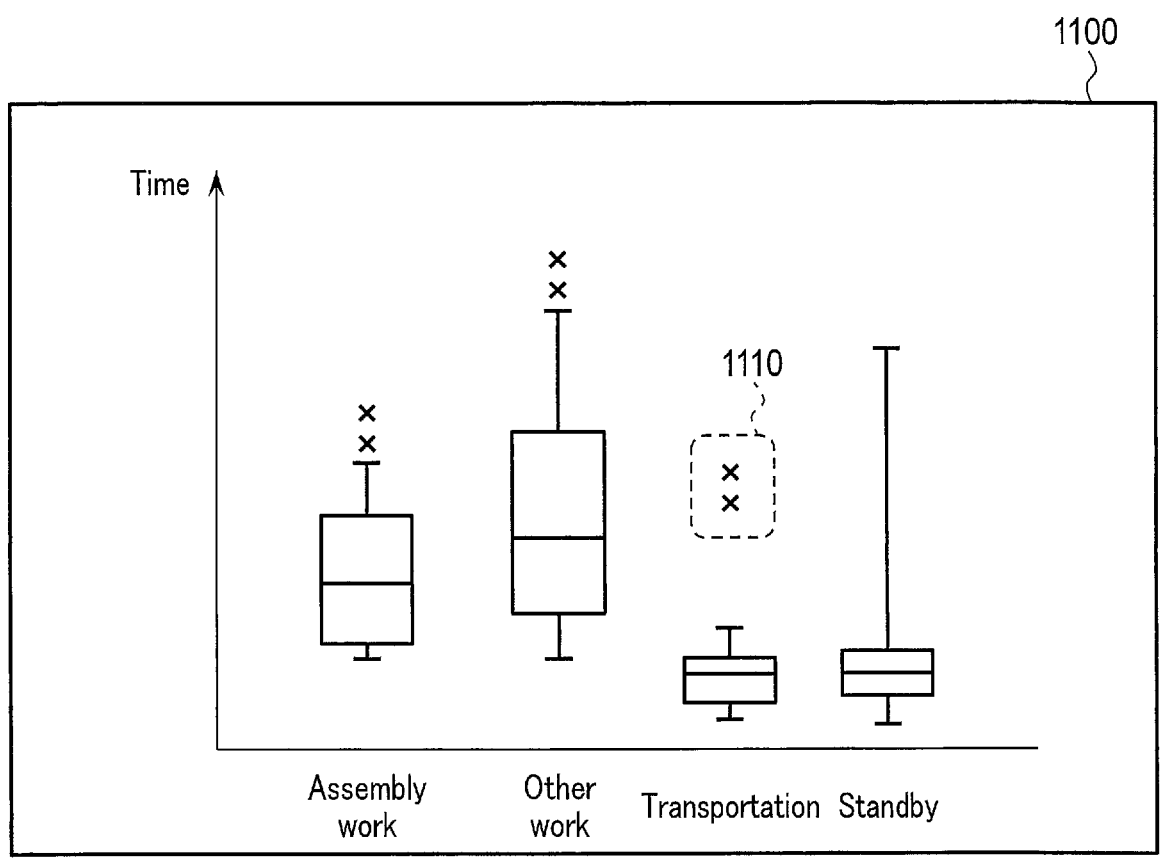
F I G. 11

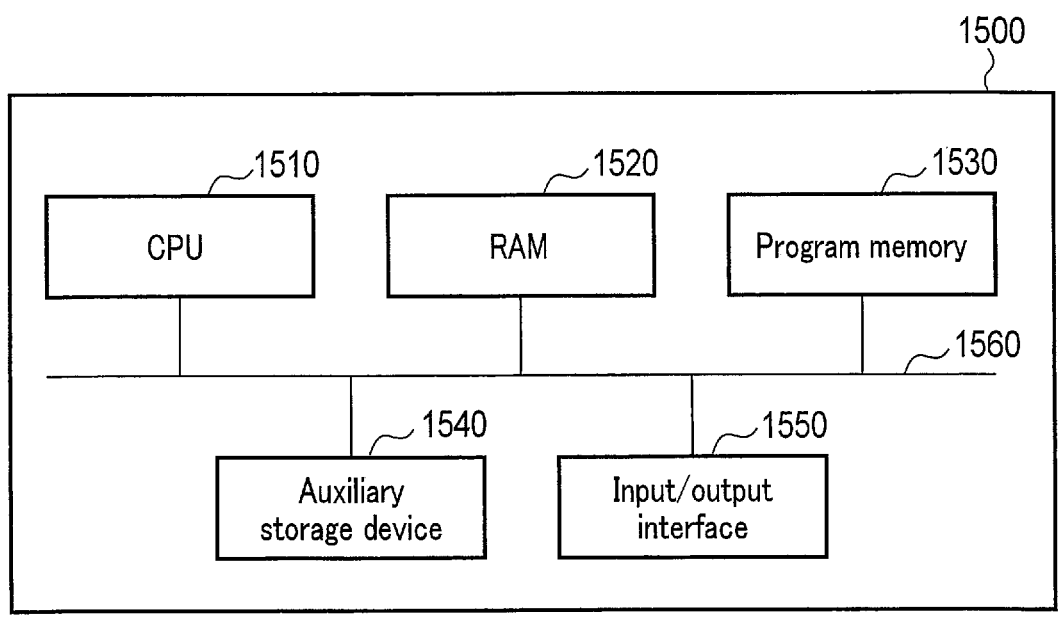
F I G. 15

WORK ESTIMATION APPARATUS, WORK ESTIMATION METHOD, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2021-154586, filed Sep. 22, 2021, the entire contents of which are incorporated herein by reference.

FIELD

Embodiments described herein relate generally to a work estimation apparatus, a work estimation method, and a non-transitory computer-readable storage medium.

BACKGROUND

Recently, as a smart factory, digitization of factory equipment is being promoted. On the other hand, focusing on workers who work in a factory, methods used to acquire and utilize workers' information are often no different from conventional methods, thus technological development is required.

As an example of a conventional method, work of a worker (e.g., an operational status) is grasped based on comprehensive judgment of an observer. However, with this method, problems such as retaining of only data at the time of observation by the observer, analysis results that vary depending on the skill of the observer, and the lack of ability for comparison with other places based on the same criteria arise. Therefore, it is required to estimate the work of the worker regardless of the observation situation related to the observer, the observation place, the worker, etc.

BRIEF DESCRIPTION OF THE DRAWINGS

FIG. 1 is a block diagram showing a configuration example of a work estimation system including a work estimation apparatus according to a first embodiment.

FIG. 2 is a block diagram showing a configuration example of a processing unit of the work estimation apparatus of FIG. 1.

FIG. 3 is a flowchart showing an operation example of the work estimation apparatus of FIG. 1.

FIG. 11 is an example of display data showing an operational status of a particular worker by a box plot according to the second embodiment.

FIG. 15 is a block diagram exemplifying a hardware configuration of a computer according to an embodiment.

DETAILED DESCRIPTION

Figure 4:
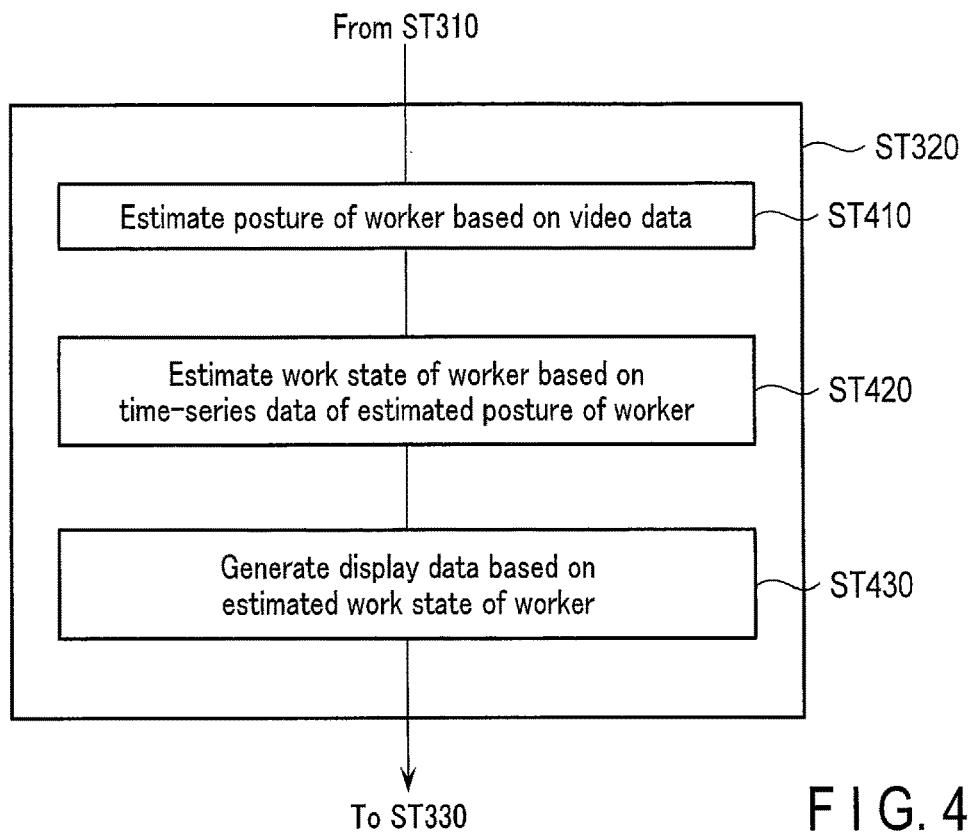
FIG. 4 is a flowchart showing a specific example of work state estimation processing of FIG. 3.

In general, according to one embodiment, a work estimation apparatus includes processing circuitry. The processing circuitry acquires video data on a predetermined area, estimates a work state of a worker included in the video data based on the video data, and outputs display data including a graph related to the work state.

Embodiments of the work estimation apparatus will now be described in detail with reference to the accompanying drawings.

First Embodiment

FIG. 1 is a block diagram showing a configuration example of a work estimation system 1 including a work estimation apparatus 10 according to the first embodiment. The work estimation system 1 includes the work estimation apparatus 10, a photographing device 20, a storage device 30, and an output device 40. The work estimation system 1 is used for estimating a state (work state) related to work of a worker in a target area (e.g., a production site), and presenting (visualizing) the state in a format that is easy for a user to comprehend.

The term "work state" refers to a discretionary action that a worker performs. In the present embodiment, as work states, seven actions including parts acquisition, tool work, assembly work, walking, transportation, standby, and other work will be described as specific examples. Note that the work states are not limited to the above actions, and a target area (predetermined area) to be estimated by the work estimation system 1 and a predetermined action may be associated with each other, or a discretionary action may be associated with a worker.

The photographing device 20 is, for example, a video camera. The photographing device 20 photographs a work area (e.g., a production line at a production site) in which work is performed by a worker, and acquires a still image or a moving image. In the present embodiment, the still image or moving image acquired by the photographing device 20 is referred to as video data. The photographing device 20 outputs the acquired video data to the storage device 30. The photographing device 20 may output the acquired video data directly to the work estimation apparatus 10. The video data may include a photographing time.

The storage device 30 is a computer-readable storage medium that stores data in a nonvolatile manner. This storage medium is, for example, a flash memory, a hard disk drive (HDD), or a solid state drive (SSD). The storage device 30 stores video data output from the photographing device 20. Furthermore, the storage device 30, for example, stores a plurality of processing data used in the work estimation apparatus 10. The plurality of processing data include, for example, posture estimation data, state estimation data, and display conversion data. Details of each of the plurality of data will be described later. The storage device 30 outputs video data and a plurality of processing data to the work estimation apparatus 10 in response to access from the work estimation apparatus 10.

The video data stored in the storage device 30 may be, for example, associated with date information. The storage device 30 may also store data generated by the work estimation apparatus 10. The storage device 30 may be provided in an external server. The storage device 30 may include a plurality of storage media.

The work estimation apparatus 10 is, for example, a computer used by a system administrator (hereinafter, referred to as a user) who manages the work estimation system 1. The work estimation apparatus 10 includes an acquisition unit 110, a processing unit 120, and a display control unit 130. The work estimation apparatus 10 may include at least one of the photographing device 20, the storage device 30, and the output device 40.

The acquisition unit 110 acquires video data from the storage device 30. The acquired video data may be video data that is photographed in real time by the photographing device 20 and stored in order in the storage device 30, or may be video data that is stored in advance in the storage device 30. The acquisition unit 110 outputs the acquired video data to the processing unit 120. The acquisition unit 110 may acquire video data directly from the photographing device 20. For example, the acquisition unit 110 may collectively acquire video data as one piece of data, or may sequentially acquire video data in a streaming format.

The processing unit 120 receives video data from the acquisition unit 110. By accessing the storage device 30, the processing unit 120 also receives a plurality of processing data necessary for processing the video data. The processing unit 120 estimates a work state of a worker based on the video data. The processing unit 120 generates display data related to the estimated work state, and outputs it to the display control unit 130. Details of the display data will be described later.

The processing unit 120 may cause the storage device 30 to store information related to the estimated work state (work information), or may cause the storage device 30 to store the work information in association with the video data or information related to the video data (video data information). The video data information includes, for example, a file name of the video data and frame information related to a frame constituting the video data. By causing the storage device 30 to store the work information in association with the video data or the video data information, the work estimation apparatus 10 can perform generation of display data with a large amount of information. In the following, a specific configuration example of the processing unit 120 will be described.

FIG. 2 is a block diagram showing a configuration example of the processing unit 120 of the work estimation apparatus 10 according to the first embodiment. The processing unit 120 includes a posture estimation unit 210, a state estimation unit 220, and a display data generation unit 230.

The posture estimation unit 210 estimates a posture of the worker based on the video data. Specifically, the posture estimation unit 210 detects a worker from the video data by using posture estimation data, and estimates a posture of the detected worker. The posture estimation unit 210 outputs information on the estimated posture of the worker to the state estimation unit 220.

The posture of the worker is approximately synonymous with a skeletal form of the worker or positions of a plurality of body parts of the worker. The positions of the plurality of body parts of the worker are, for example, an eye position, a shoulder position, an elbow position, and a wrist position. The posture of the worker may also include a state of the worker (e.g., a neck bending state and a waist bending state). In addition, the posture of the worker may include a fingertip position, an ankle position, an armpit opening state, etc. From the above, the posture of the worker may be paraphrased as the positions and states of the plurality of body parts of the worker.

The posture estimation data include, for example, a learned machine learning model (hereinafter, referred to simply as a "learned model") trained to detect a person from video data, a learned model trained to estimate a posture of a person, and a learned model trained to perform both. As these learned models, a Neural Network (NN) is used, and preferably a Convolutional Neural Network (CNN) is used. By using the CNN, a target (a worker in the present embodiment) can be accurately detected from an image. The learned model is not limited to the CNN, and various other NNs suitable for intended use (e.g., Graph Neural Network (GNN), 3D-CNN, etc.) may be used. The same applies to the processing described below.

The learned models used to estimate the posture of a person include, for example, a two-dimensional skeleton estimation model that estimates a skeleton of a person of video data on a two-dimensional image, and a three-dimensional skeleton estimation model that estimates a three-dimensional skeleton by applying a two-dimensional skeleton estimation result (corresponding to a "two-dimensional human skeleton model" to be described later) to normalized three-dimensional coordinates. The two-dimensional skeleton estimation model and the three-dimensional skeleton estimation model may be collectively referred to as a skeleton estimation model.

The two-dimensional skeleton estimation model is trained in advance such that a person can be detected from video data and a skeleton can be detected from the detected person. The three-dimensional skeleton estimation model is trained in advance such that a three-dimensional skeleton can be estimated from a skeleton of a person on a two-dimensional image. Further, a three-dimensional skeleton estimation model that estimates a three-dimensional human skeleton model of a person directly from video data may be used without using a two-dimensional skeleton estimation model. In this case, a two-dimensional human skeleton model may be estimated from the three-dimensional human skeleton model.

The posture estimation unit 210 may specify a worker based on the video data. Specifically, the posture estimation unit 210 identifies a detected worker by using worker identification data. The worker identification data includes, for example, a learned model (worker identification model) trained to identify a worker from video data. The worker identification model is trained in advance such that a worker can be identified from a face photograph of the worker and a photograph of clothes of the worker.

The state estimation unit 220 receives information on a posture of the worker from the posture estimation unit 210. The state estimation unit 220 estimates a work state of the worker based on time-series data of the estimated posture of the worker. Specifically, the state estimation unit 220 estimates the work state based on transition of the posture of the worker in the time-series data by using state estimation data. The state estimation unit 220 outputs information on the estimated work state of the worker to the display data generation unit 230.

The state estimation data is, for example, a learned model trained to estimate a work state from time-series data of a posture. The learned model used to estimate the work state includes, for example, a state estimation model that estimates an action of a person from time-series data on a three-dimensional skeleton estimation result ("three-dimensional human skeleton model" described above). The state estimation model is trained in advance such that an action of a person can be estimated from time-series data on a three-dimensional skeleton.

The learned models, which include the above posture estimation data and state estimation data, may be integrated. For example, the state estimation model may include a two-dimensional skeleton estimation model and a three-dimensional skeleton estimation model. In this case, the posture estimation unit 210 may be omitted, and the state estimation unit 220 may estimate a work state of a worker directly based on video data.

Alternatively, the state estimation unit 220 may make various determinations based on a posture of a worker and estimate a work state by using the determination results (e.g., by inputting the determination results into the state estimation model). The various determinations include, for example, a line-of-sight determination, an area determination, a state determination, a holding determination, etc. Further, the state estimation unit 220 may estimate a work state by combining these determinations. These determinations will be described later.

The display data generation unit 230 receives information on a work state of a worker from the state estimation unit 220. The display data generation unit 230 generates display data based on the work state of the worker. Specifically, the display data generation unit 230 uses display conversion data to generate display data in which the work state of the worker is converted into an expression format that is easy for the user to comprehend. The display data generation unit 230 outputs the generated display data to the display control unit 130.

The display conversion data includes, for example, data for converting the information into a graph in which the worker's work state and time are associated with each other. The display conversion data may include data such as a GUI (Graphical User Interface) for displaying the above graph.

The display control unit 130 receives display data from the processing unit 120 (the display data generation unit 230). The display control unit 130 causes the output device 40 to output and display the display data.

The output device 40 is, for example, a monitor. The output device 40 receives display data from the display control unit 130. The output device 40 displays the display data. The output device 40 is not limited to a monitor as long as the display data can be displayed. For example, the output device 40 may be a projector or a printer. The output device 40 may include a speaker.

The work estimation apparatus 10 may include a memory and a processor (neither is shown). The memory stores, for example, various programs related to the operation of the work estimation apparatus 10 (e.g., a work estimation program that estimates work of a worker). The processor realizes each function of the acquisition unit 110, the processing unit 120 (the posture estimation unit 210, the state estimation unit 220, and the display data generation unit 230), and the display control unit 130 by executing the various programs stored in the memory.

The configurations of the work estimation apparatus 10 and the work estimation system 1 according to the first embodiment have been described above. Next, the operation of the work estimation apparatus 10 will be described with reference to the flowchart of FIG. 3.

FIG. 3 is a flowchart showing an operation example of the work estimation apparatus 10 according to the first embodiment. The process of the flowchart of FIG. 3 starts when a work estimation program is executed by the user. In the following descriptions of the flowchart, estimating a work state of one worker will be described, but the present invention is not limited thereto. For example, the work estimation apparatus 10 may estimate a work state of each of a plurality of workers.

(Step ST310)

When the work estimation program is executed, the acquisition unit 110 acquires video data from the storage device 30. The acquisition unit 110 outputs the acquired video data to the processing unit 120.

(Step ST320)

After the video data is acquired, the processing unit 120 estimates a work state of a worker based on the video data. The processing unit 120 also generates display data including a graph related to the work state. Hereinafter, the processing of step ST320 will be referred to as "work state estimation processing". In the following, a specific example of the work state estimation processing will be described with reference to the flowchart of FIG. 4.

FIG. 4 is a flowchart showing a specific example of the work state estimation processing according to the first embodiment. The flowchart of FIG. 4 illustrates details of the processing of step ST320 shown in FIG. 3. The flowchart of FIG. 4 starts upon transition from step ST310.

(Step ST410)

After the video data is acquired, the posture estimation unit 210 estimates a posture of the worker based on the video data. Specifically, the posture estimation unit 210 estimates positions and states of a plurality of body parts of the worker by using a skeleton estimation model for each of a plurality of frames of the video data.

(Step ST420)

The state estimation unit 220 estimates a work state of the worker based on time-series data of the estimated posture of the worker. Specifically, the state estimation unit 220 estimates the work state based on transition of the positions and states of the plurality of body parts of the worker in the plurality of consecutive frames of the video data. More specifically, the state estimation unit 220 estimates a work state at each time of the video data based on the time-series data related to the positions and states of the plurality of body parts. In the following, a further specific example of the estimation of the work state will be described.

For example, the state estimation unit 220 may perform a line-of-sight determination of whether or not the worker is looking at his/her hand side based on an eye position and a neck bending state of the worker. In this case, the state estimation unit 220 estimates the work state by using at least a determination result of the line-of-sight determination.

For example, the state estimation unit 220 may perform an area determination of whether or not a waist position of the worker is included in a particular range of the video data. The particular range is, for example, a range in which a manufacturing device is placed, and a range in which a tool is recognized. In this case, the state estimation unit 220 estimates the work state by using at least a determination result of the area determination.

For example, the state estimation unit 220 may perform a state determination of whether or not the worker is in a standby state based on an ankle position and an armpit opening state. In this case, the state estimation unit 220 estimates the work state by using at least a determination result of the state determination.

For example, the state estimation unit 220 may perform a holding determination of whether or not the worker is holding a tool based on a wrist position and a fingertip position. In this case, the state estimation unit 220 estimates the work state by using at least a determination result of the holding determination.

Note that the state estimation unit 220 may perform the above various determinations in combination, and may use one determination result for estimation of a plurality of actions in the work state. For example, the state estimation unit 220 may estimate a work state of transportation by using determination results of the line-of-sight determination and the area determination. For example, the state estimation unit 220 may estimate work states of parts acquisition and assembly work by using a determination result of the line-of-sight determination.

(Step ST430)

The display data generation unit 230 generates display data based on the estimated work state of the worker. The display data to be generated may be determined by an instruction of the user in advance. For example, the display data includes a graph tallying work states of the worker. Specifically, the display data generation unit 230 generates a graph tallying an operating time of a work state in a discretionary period, and outputs this as display data or generates display data including that graph.

As the discretionary period, for example, an operating time per day may be set, or a time may be automatically set by designating a work process. The graph is, for example, a bar graph, a pie chart, or a Gantt chart.

For example, the display data generation unit 230 may be set with a time (e.g., an operating time) to be displayed on a graph by an instruction of the user. Specifically, in the work estimation apparatus 10, a start time and an end time corresponding to the time in the video data may be instructed by an input device (not shown). Further, in the work estimation apparatus 10, a start time and a discretionary time length may be instructed, and a discretionary time length that goes back from a current time may be instructed. These hold true of the embodiments to be described below.

(Step ST330)

After the display data is generated, the display control unit 130 outputs the display data related to the work state. Specifically, the display control unit 130 causes a monitor to display the display data including a graph related to the work state. After the processing of step ST330, the work estimation program is ended.

Where the video data is acquired in real time, the process flow may return to step ST310 after the processing of step ST330, and the subsequent processes may be repeated. Thereby, the work estimation apparatus 10 may generate the display data in real time. The work estimation program may be ended in response to an instruction by the user.

The above has described the operation of the work estimation apparatus 10. In the following, a specific example of the display data generated by the work estimation apparatus 10 will be described with reference to FIGS. 5 to 7.

Figure 5:
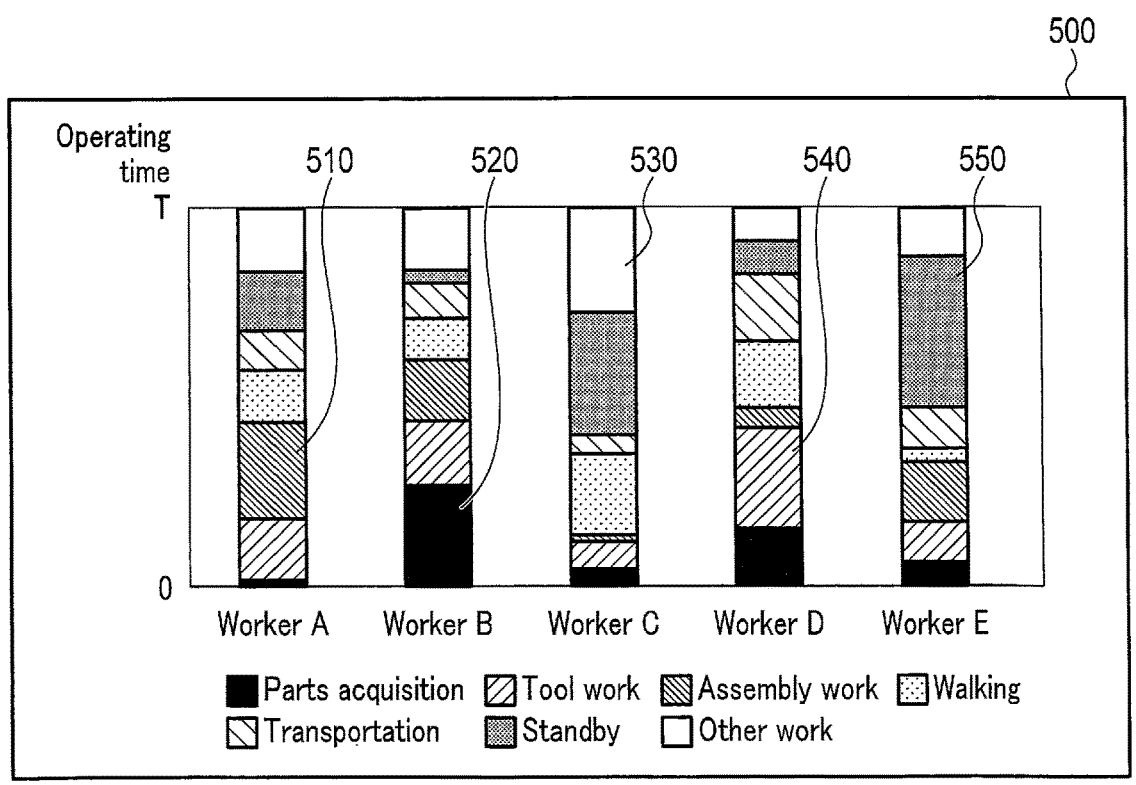
FIG. 5 is an example of display data showing an operational status of each worker on a certain day by a bar graph according to a first embodiment.

FIG. 5 is an example of display data showing an operational status of each worker on a certain day by a bar graph according to the first embodiment. Display data 500 of FIG. 5 shows a bar graph accumulating times of actions in a work state for each of five workers A, B, C, D, and E in a vertical direction. In the bar graph, in the order of parts acquisition, tool work, assembly work, walking, transportation, standby, and other work from the bottom, operating times of the actions are shown by the heights.

The user can grasp an operational status of each worker by viewing the display data 500. For example, it can be understood that assembly work 510 in the bar graph of the worker A has the longest operating time as compared with the assembly work of the other workers. Similarly, it can be understood that each of parts acquisition 520 in the bar graph of the worker B, other work 530 in the bar graph of the worker C, tool work 540 in the bar graph of the worker D, and standby 550 in the bar graph of the worker E has the longest operating time as compared with the same action of the other workers.

Figure 6:
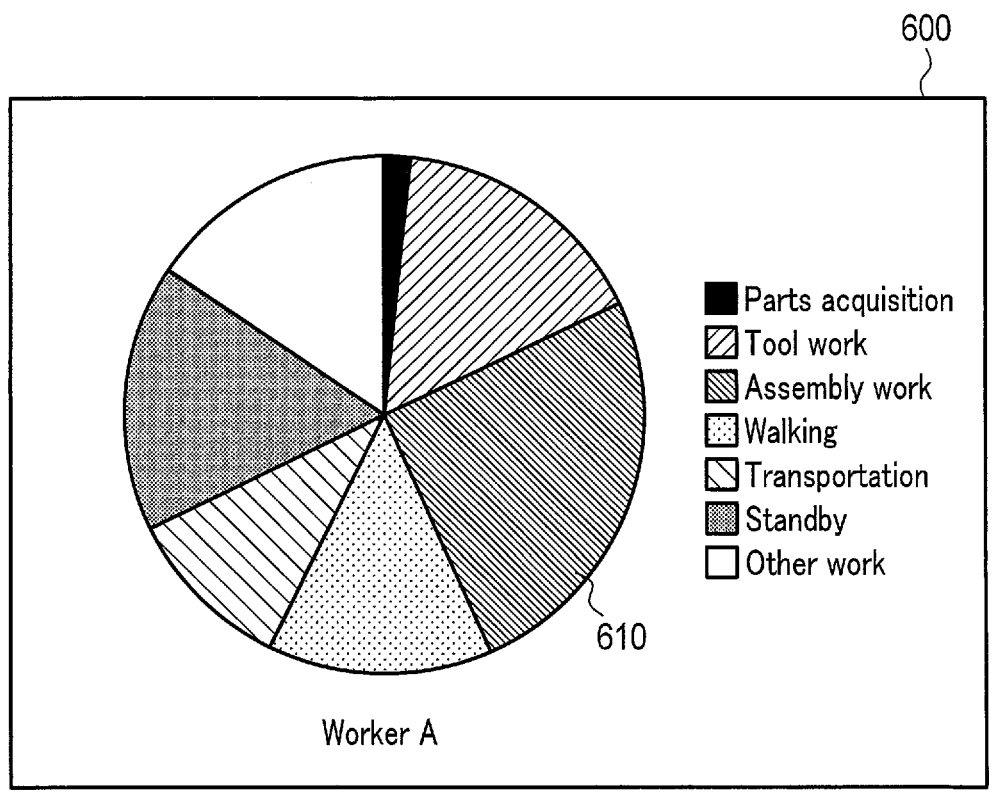
FIG. 6 is an example of display data showing an operational status of a particular worker on a certain day by a pie chart according to the first embodiment.

FIG. 6 is an example of display data showing an operational status of a particular worker on a certain day by a pie chart according to the first embodiment. Display data 600 of FIG. 6 shows a pie chart accumulating the times of the actions in the work state for the worker A. In the pie chart, in the order of parts acquisition, tool work, assembly work, walking, transportation, standby, and other work in a clockwise fashion from the twelve o'clock position, the operating times of the actions are shown by the angles.

The user can grasp an operational status of a particular worker (the worker A as an individual) by viewing the display data 600. For example, it can be understood, from the pie chart, that assembly work 610 has the largest operating time ratio as compared with the other actions.

Figure 7:
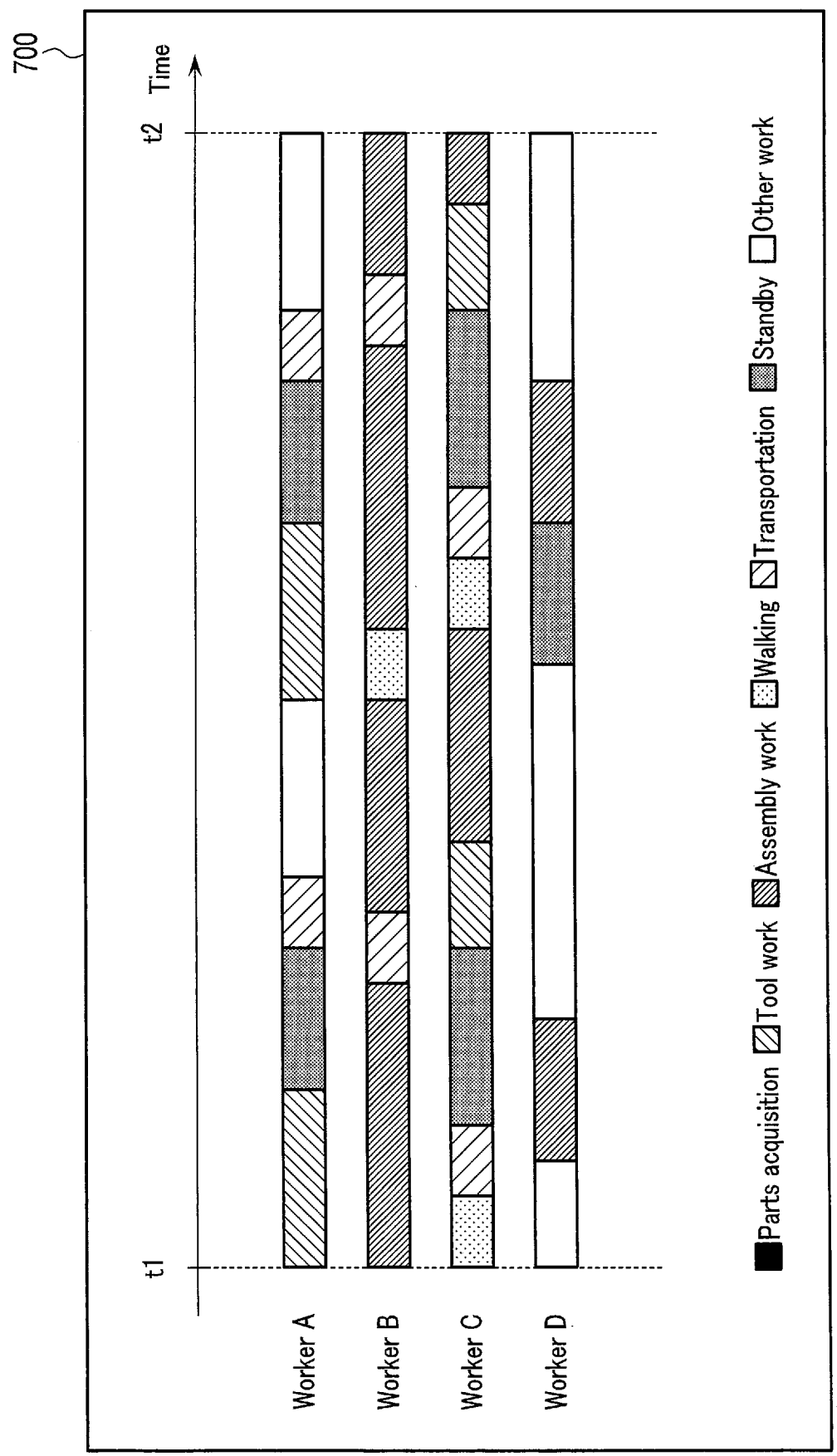
FIG. 7 is an example of display data showing an operational status of each worker during a particular period by a Gantt chart according to the first embodiment.

FIG. 7 is an example of display data showing an operational status of each worker during a particular period by a Gantt chart according to the first embodiment. Display data 700 of FIG. 7 shows a Gantt chart in which each action and time in a work state are associated with each other for each of four workers A, B, C, and D. The Gantt chart shows the actions of the workers at each time in a range from time t1 to time t2. In other words, the Gantt chart shows transition of a work state in a discretionary period.

The user can grasp work transition between workers by viewing the display data 700. Specifically, when the four workers A, B, C, and D shown in the display data 700 are in a particular work process, the user can, for example, identify a worker who represents a bottleneck by grasping the actions between the workers.

As described above, the work estimation apparatus according to the first embodiment acquires video data on a predetermined area, estimates a work state of a worker included in the video data, and displays display data including a graph related to the work state.

Therefore, the work estimation apparatus according to the first embodiment can estimate the work state without the need to acquire determination by the user, thereby estimating the work of the worker regardless of an observation situation.

Second Embodiment

In the first embodiment described above, various visualizations of an operational status of a worker based on an estimated work state are described. In the second embodiment, on the other hand, a description will be given of grasping the operational status of the worker in more detail by analyzing the estimated work state. Since elements assigned with the same reference signs as those assigned to the elements in FIGS. 1 and 2 are similar configurations, descriptions thereof will be omitted.

Figure 8:
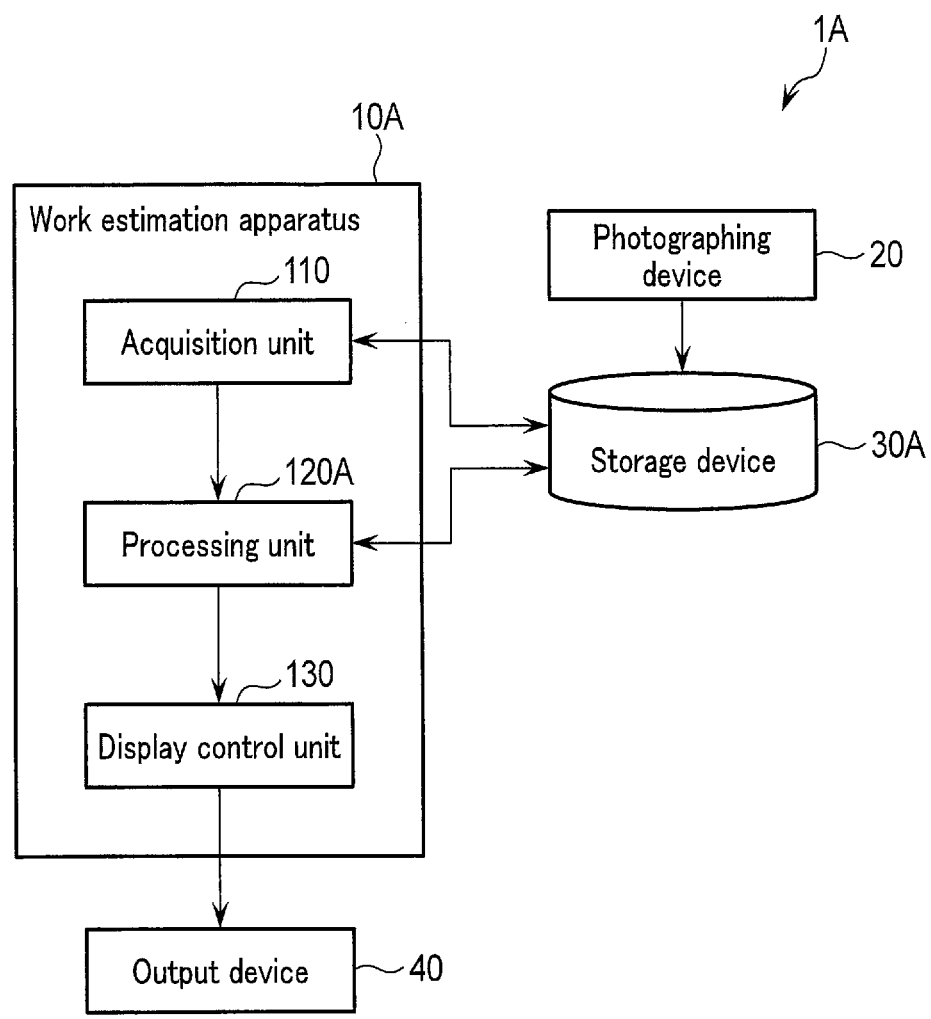
FIG. 8 is a block diagram showing a configuration example of a work estimation system including a work estimation apparatus according to a second embodiment.

FIG. 8 is a block diagram showing a configuration example of a work estimation system 1A including a work estimation apparatus 10A according to the second embodiment. The work estimation system 1A includes the work estimation apparatus 10A, a photographing device 20, a storage device 30A, and an output device 40.

The storage device 30A is a computer-readable storage medium that stores data in a nonvolatile manner. The storage device 30A stores video data output from the photographing device 20. Furthermore, the storage device 30A, for example, stores a plurality of processing data used in the work estimation apparatus 10A. The plurality of processing data in the second embodiment include, for example, analysis data, in addition to the plurality of processing data as described in the first embodiment. Details of the analysis data will be described later. The storage device 30A outputs video data and a plurality of processing data to the work estimation apparatus 10A in response to access by the work estimation apparatus 10A.

The work estimation apparatus 10A is, for example, a computer used by a user who manages the work estimation system 1A. The work estimation apparatus 10A includes an acquisition unit 110, a processing unit 120A, and a display control unit 130.

The processing unit 120A receives video data from the acquisition unit 110. By accessing the storage device 30A, the processing unit 120A receives a plurality of processing data. The processing unit 120A estimates a work state of a worker based on the video data. The processing unit 120A also generates an analysis result related to an operational status of the worker by analyzing the work state of the worker. The processing unit 120A generates display data related to the estimated work state to which the content of the analysis result is reflected, and outputs the data to the display control unit 130. Details of the display data according to the second embodiment will be described later. In the following, a specific configuration example of the processing unit 120A will be described.

Figure 9:
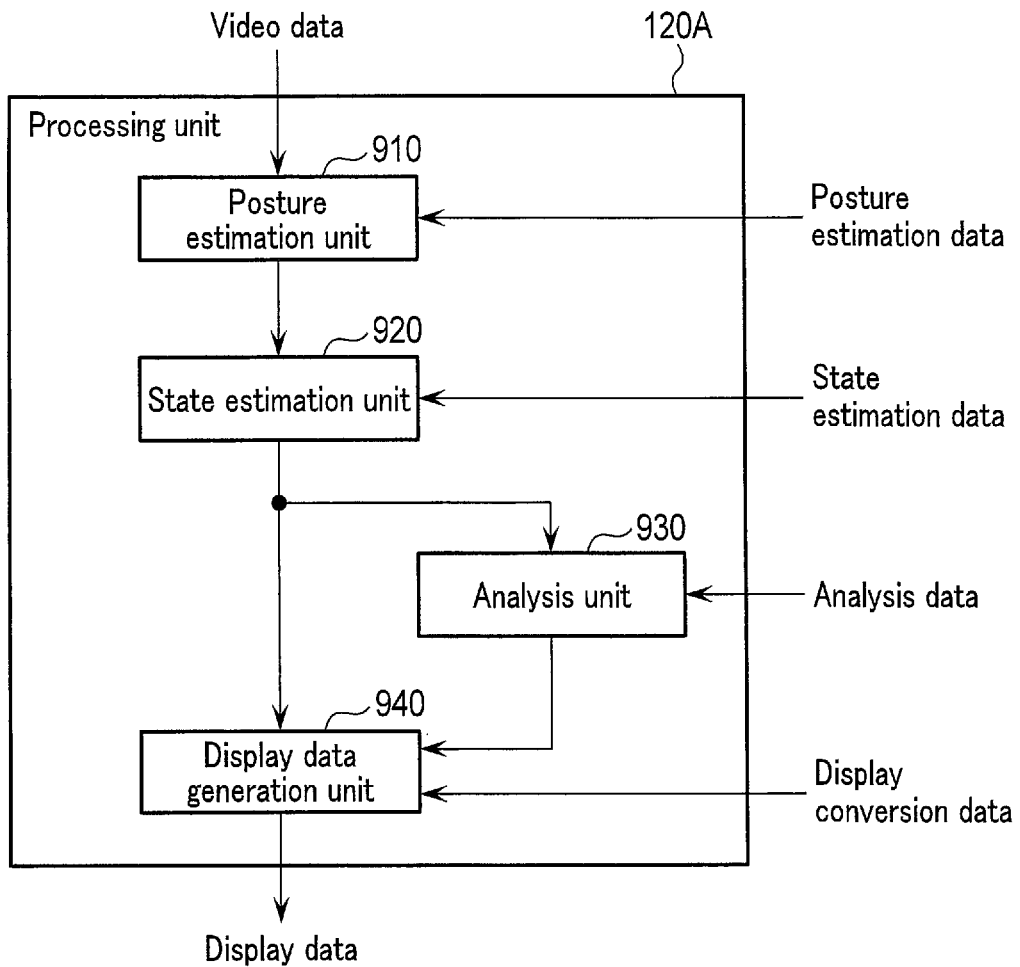
FIG. 9 is a block diagram showing a configuration example of a processing unit of the work estimation apparatus of FIG. 8.

FIG. 9 is a block diagram showing a configuration example of the processing unit 120A of the work estimation apparatus 10A according to the second embodiment. The processing unit 120A includes a posture estimation unit 910, a state estimation unit 920, an analysis unit 930, and a display data generation unit 940. Since the posture estimation unit 910 is similar to the posture estimation unit 210, a description thereof will be omitted.

The state estimation unit 920 receives information on a posture of the worker from the posture estimation unit 910. The state estimation unit 920 estimates a work state of the worker based on time-series data of the estimated posture of the worker. The state estimation unit 920 outputs information on the estimated work state of the worker to the analysis unit 930 and the display data generation unit 940.

The analysis unit 930 receives the information on the work state of the worker from the state estimation unit 920. The analysis unit 930 generates an analysis result related to an operational status of the worker by analyzing the work state of the worker. Specifically, the analysis unit 930 identifies a combination of transition of a work state of a particular worker or a combination of transition of work states between a plurality of workers by using analysis data, and generates the identified combination as an analysis result. The analysis unit 930 outputs the analysis result to the display data generation unit 940.

The analysis data includes, for example, a combination of transition of a work state. The combination of transition of a work state is, for example, a combination of adjacent actions when the work state is expressed by a Gantt chart. The combination of adjacent actions is, with reference to the Gantt chart of the display data 700 of FIG. 7 as an example, a combination of the "tool work", which is an action of the worker A at time t1, and the "standby", which is the subsequent action.

Further, the analysis unit 930 may perform an analysis of further classifying each action in a work state of a worker, and may perform an analysis based on a past work state of a worker. The classification of action includes, for example, an operating state, an accompanying state, and a non-operating state. The analysis data may include data for performing these analyses. The analysis unit 930 may calculate a time ratio of each state when performing the above classification analysis.

The display data generation unit 940 receives the information on the work state of the worker from the state estimation unit 920, and receives the analysis result from the analysis unit 930. The display data generation unit 940 generates display data based on the work state of the worker. Furthermore, the display data generation unit 940 reflects the content of the analysis result to the display data. Specifically, the display data generation unit 940 highlights the content of the analysis result with respect to a graph (e.g., a Gantt chart) included in the display data. The display data generation unit 940 outputs to the display control unit 130 the display data to which the analysis result is reflected.

The above has described the configurations of the work estimation apparatus 10A and the work estimation system 1A according to the second embodiment. Next, the operation of the work estimation apparatus 10A will be described. Since the overall operation of the work estimation apparatus 10A is similar to the flowchart of FIG. 3 in the first embodiment, a description thereof will be omitted. The second embodiment is different from the first embodiment in the point that the work state estimation processing of step ST320 in the flowchart of FIG. 3 is replaced with step ST320A. In the following, therefore, step ST320A will be described.

Figure 10:
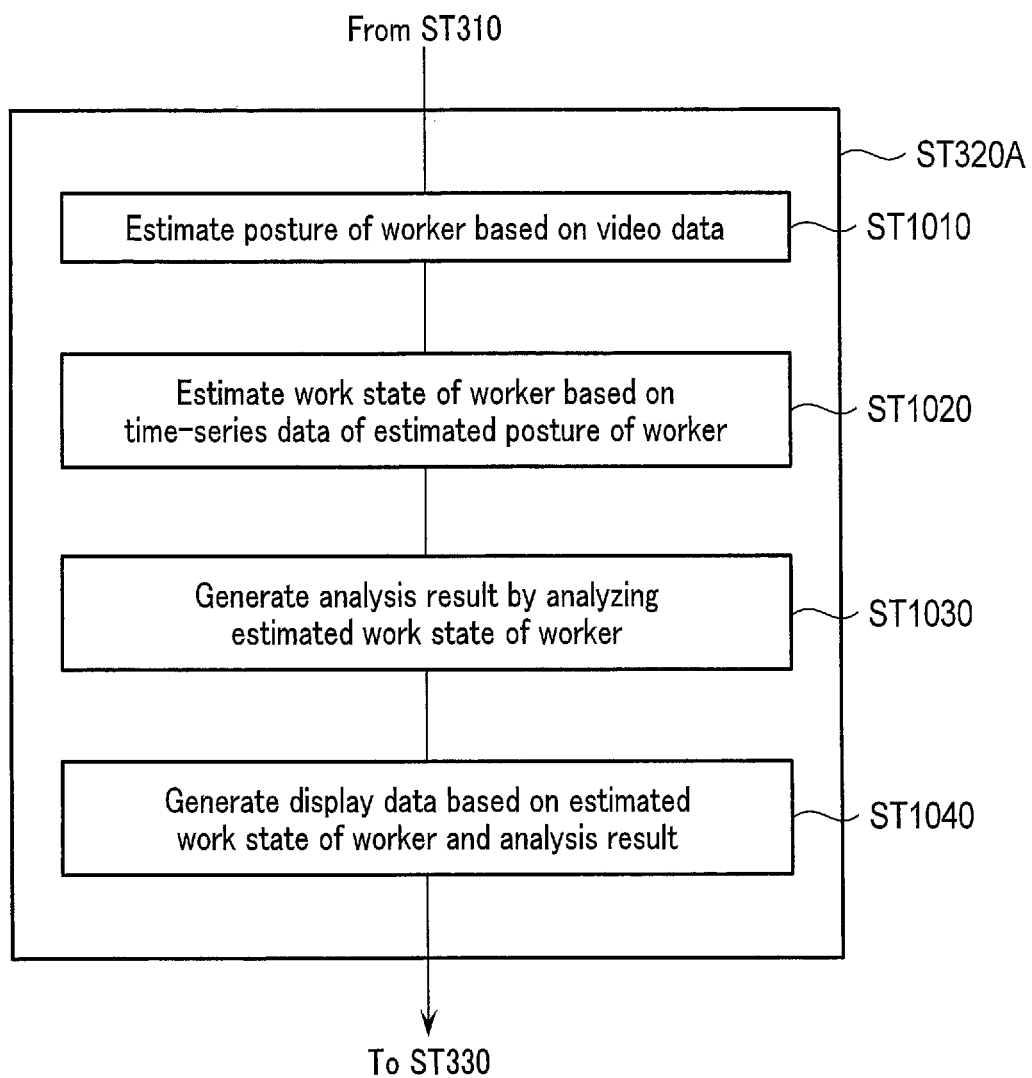
FIG. 10 is a flowchart showing a specific example of work state estimation processing according to the second embodiment.

FIG. 10 is a flowchart showing a specific example of work estimation processing according to the second embodiment. The flowchart of FIG. 10 illustrates details of processing of step ST320A. The flowchart of FIG. 10 starts upon transition from step ST310.

(Step ST1010)

After the video data is acquired, the posture estimation unit 910 estimates a posture of the worker based on the video data. Specifically, the posture estimation unit 910 estimates positions and states of a plurality of body parts of the worker by using a skeleton estimation model for each of a plurality of frames of the video data.

(Step ST1020)

The state estimation unit 920 estimates a work state of the worker based on time-series data of the estimated posture of the worker. Specifically, the state estimation unit 920 estimates the work state based on transition of the positions and states of the plurality of body parts of the worker in a plurality of consecutive frames of the video data. More specifically, the state estimation unit 920 estimates a work state at each time of the video data based on the time-series data related to the positions and states of the plurality of body parts.

(Step ST1030)

The analysis unit 930 generates an analysis result by analyzing the estimated work state of the worker. In other words, the analysis unit 930 generates an analysis result related to an operational status of the worker by performing a given analysis.

The given analysis includes, for example, an analysis for creating a new graph and an analysis for modifying (e.g., adding highlighting to) an existing graph. In the former analysis, the analysis unit 930 statistically analyzes a successive operational status of a particular worker, or performs an analysis of further classifying each action in a work state of the worker. In the latter analysis, the analysis unit 930 performs an analysis of identifying a predetermined combination of transition of a work state.

(Step ST1040)

The display data generation unit 940 generates display data based on the estimated work state of the worker and the analysis result. Specifically, when the analysis result includes information for modifying a graph, the display data generation unit 940 generates display data including a graph based on the estimated work state of the worker and then reflects the content of the analysis result to the graph. When the analysis result includes information for creating a new graph, the display data generation unit 940 may create a graph based only on the analysis result.

The above has described the operation of the work estimation apparatus 10A. In the following, a specific example of the display data to which the analysis result is reflected that is generated by the work estimation apparatus 10A will be described with reference to FIGS. 11 to 14.

FIG. 11 is an example of display data showing an operational status of a particular worker by a box plot according to the second embodiment. Display data 1100 of FIG. 11 shows distribution of some actions (assembly work, other work, transportation, and standby) in a work state for a particular worker by a box plot.

The user can grasp distribution of each action of the work state by viewing the display data 1100. For example, an outlier 1110 in the box plot corresponding to transportation is largely separated from the maximum value, and focusing on this can help when considering the work efficiency, etc.

Figure 12:
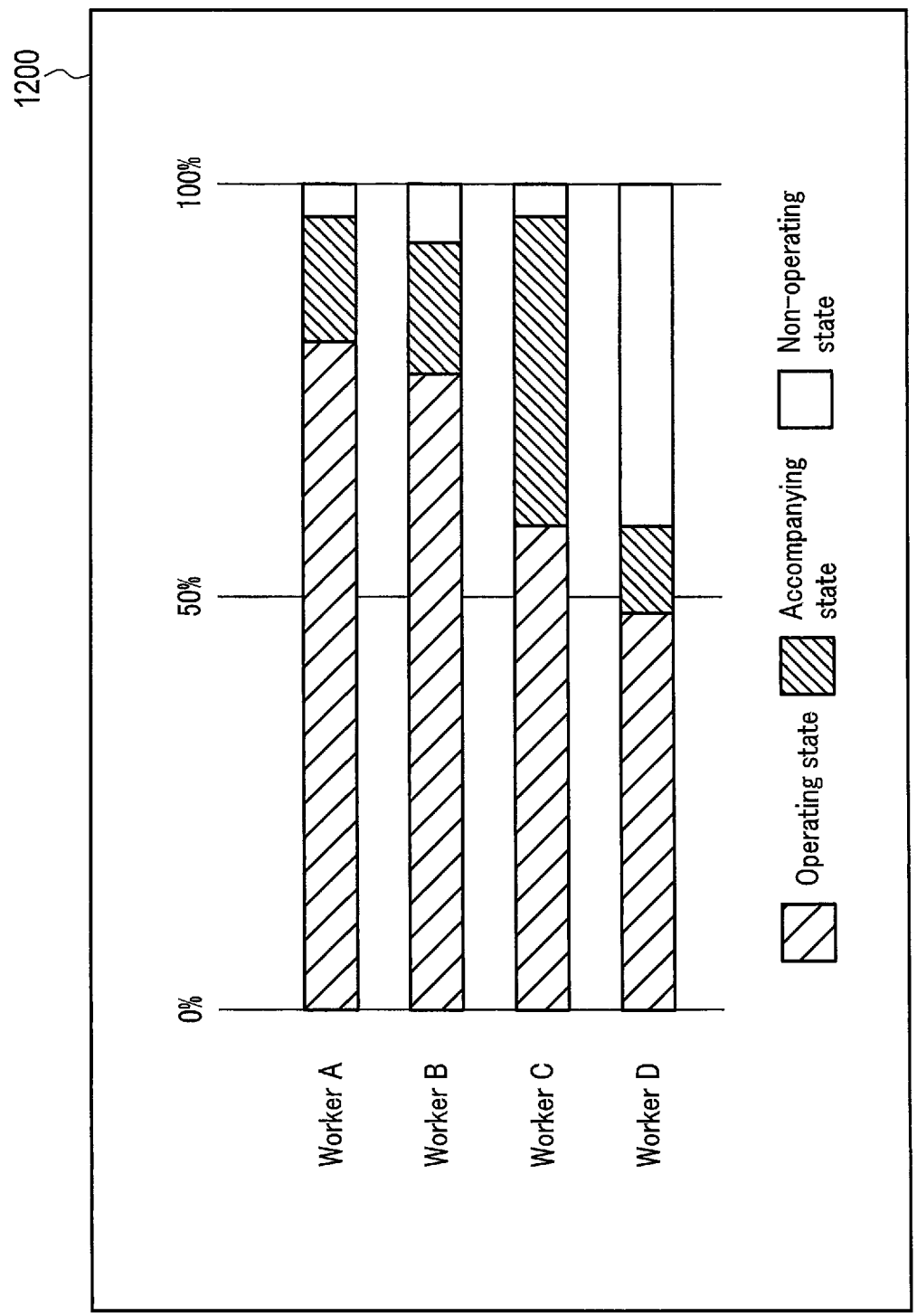
FIG. 12 is an example of display data showing an operating state, an accompanying state, and a non-operating state by a bar graph according to the second embodiment.

FIG. 12 is an example of display data showing an operating state, an accompanying state, and a non-operating state of each worker by a bar graph according to the second embodiment. Display data 1200 of FIG. 12 shows a bar graph classifying each action in a work state into the operating state, accompanying state, and non-operating state for each of four workers A, B, C, and D in a horizontal direction. In the bar graph, a ratio of each state is indicated corresponding to the length (i.e., a ratio of the operating time) in the order of the operating state, accompanying state, and non-operating state from the left.

The user can easily grasp the operating state, accompanying state, and non-operating state of each worker by viewing the display data 1200. For example, it can be understood that a ratio of the accompanying state in the bar graph of the worker C is larger than that of the accompanying state of the other workers. Similarly, it can be understood that a ratio of the non-operating state in the bar graph of the worker D is larger than that of the non-operating state of the other workers.

Figure 13:
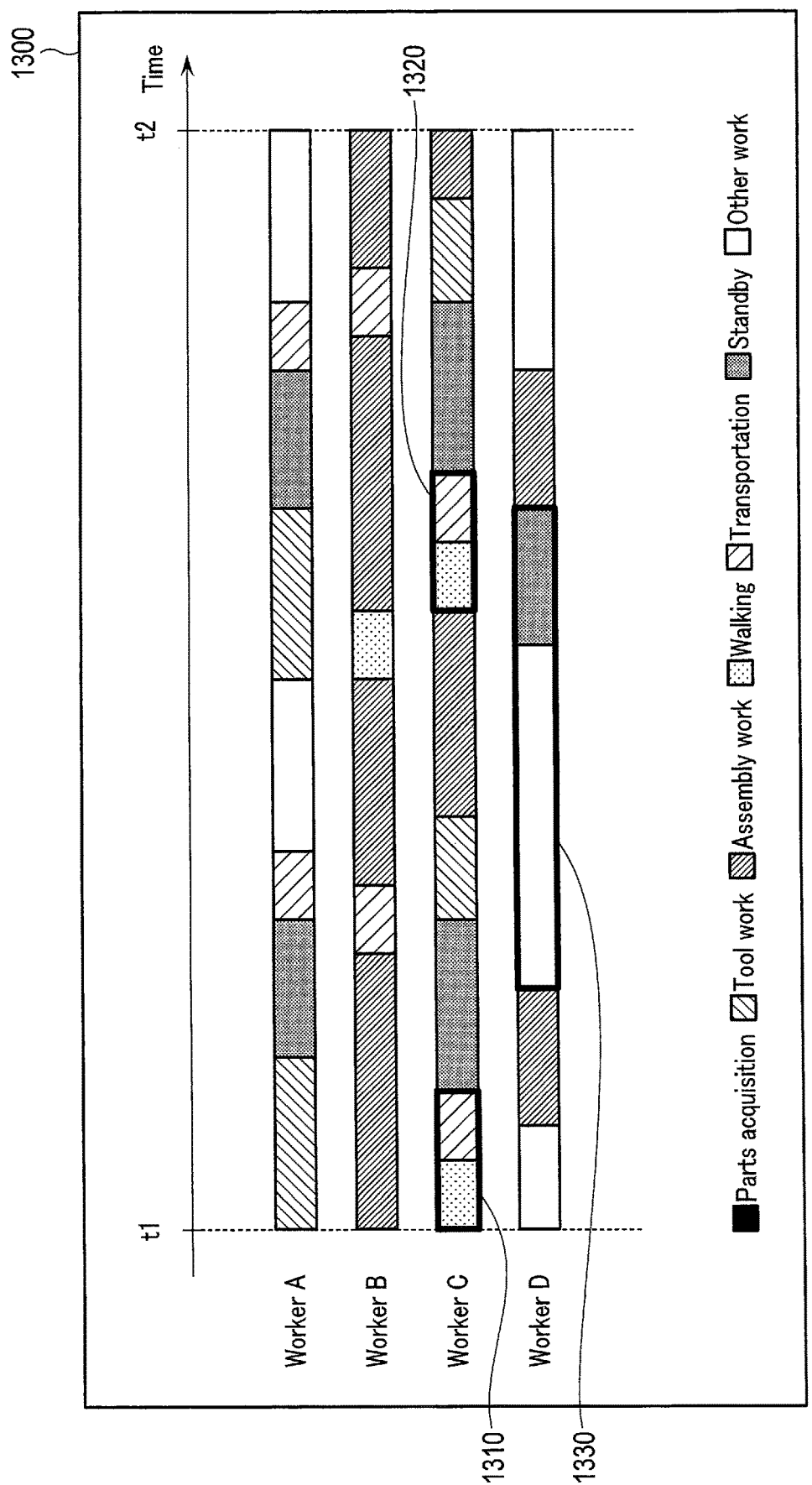
FIG. 13 is an example of display data highlighting a combination of particular work states of each worker with respect to the Gantt chart of FIG. 7.

FIG. 13 is an example of display data highlighting a combination of particular work states of each worker with respect to the Gantt chart of FIG. 7. In display data 1300 of FIG. 13, a combination of predetermined work states is identified from the Gantt chart in the display data 700 of FIG. 7, and an area of the identified combination is highlighted. In the display data 1300 of FIG. 13, an area 1310 and an area 1320 are respectively highlighted in the Gantt chart of the worker C, and an area 1330 is highlighted in the Gantt chart of the worker D.

The user can instantly grasp a combination of particular work states by viewing the display data 1300. For example, in the areas 1310 and 1320, a combination of "walking" and "transportation", as actions performed consecutively, is highlighted. Similarly, in the area 1330, a combination of "other work" and "standby", as actions performed consecutively, is highlighted. These combinations can be discretionarily selected by the user.

Figure 14:
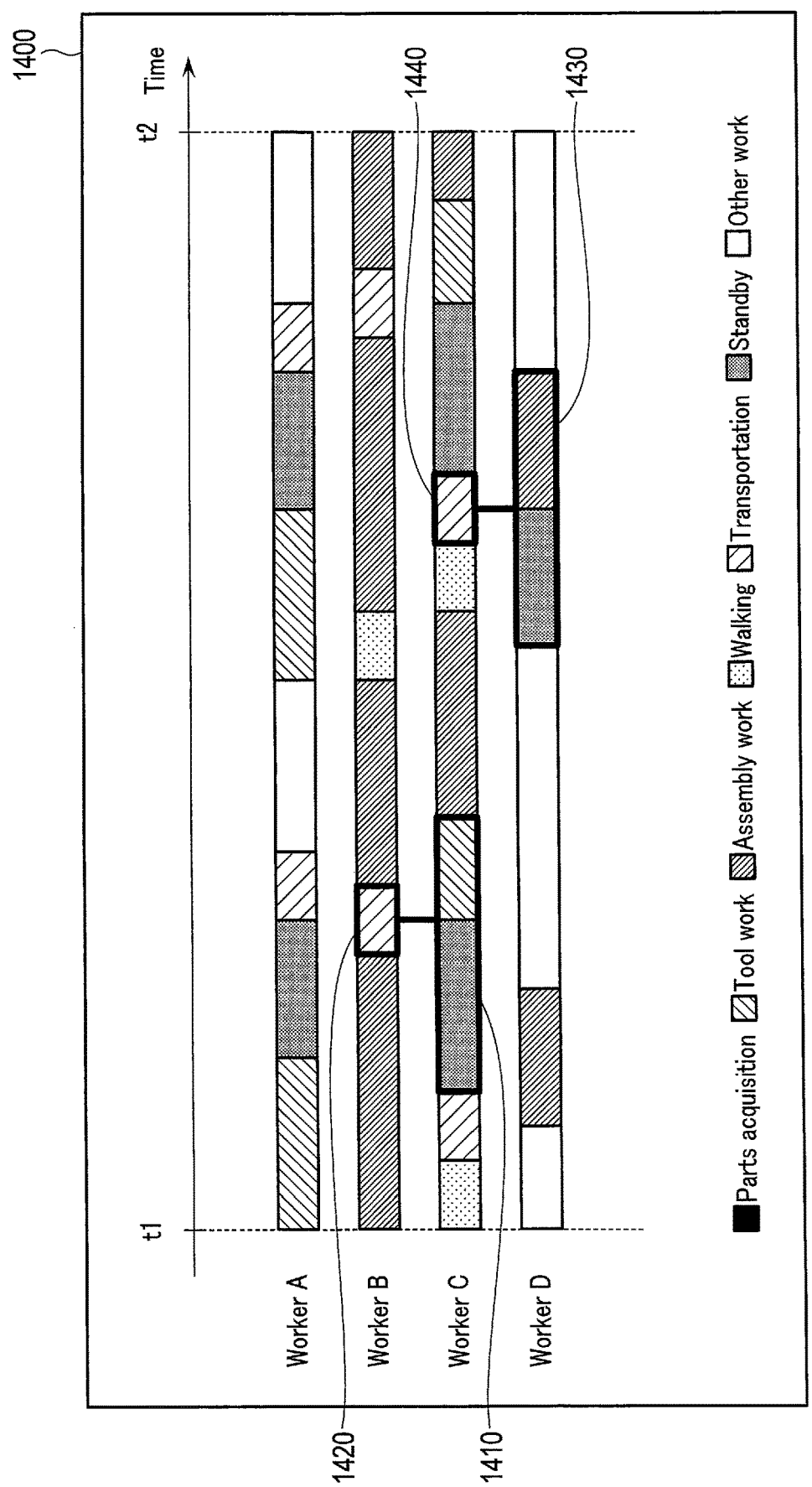
FIG. 14 is an example of display data highlighting a combination of particular work states between workers with respect to the Gantt chart of FIG. 7.

FIG. 14 is an example of display data highlighting a combination of particular work states between workers with respect to the Gantt chart of FIG. 7. In display data 1400 of FIG. 14, a combination of predetermined work states between workers is identified from the Gantt chart in the display data 700 of FIG. 7, and an area of the identified combination is highlighted. In addition, in areas associated between workers, a bar bridging them is displayed. In the display data 1400 of FIG. 14, in the Gantt charts of the workers C and B, areas 1410 and 1420 are respectively highlighted, and a bar connecting these areas is displayed. In the display data 1400, in the Gantt charts of the workers D and C, areas 1430 and 1440 are respectively highlighted, and a bar connecting these areas is displayed.

The user can instantly grasp a combination of particular work states between workers by viewing the display data 1400. For example, in the area 1410 of the worker C, a combination of "standby" and "tool work", as actions performed consecutively, is highlighted. At this time, for example, the work estimation apparatus 10A searches for a worker who performs a "transportation" action at the time of transition of "standby" and "tool work". As a search result, the area 1420 ("transportation" action) of the worker B is then highlighted together, and a bar indicating an association of the areas 1410 and 1420 is displayed.

For example, in the area 1430 of the worker D, a combination of "standby" and "assembly work", as actions performed consecutively, is highlighted. At this time, for example, the work estimation apparatus 10A searches for a worker who performs a "transportation" action at the time of transition of "standby" and "assembly work". As a search result, the area 1440 ("transportation" action) of the worker C is then highlighted together, and a bar indicating an association of the areas 1430 and 1440 is displayed.

Regarding highlighting of a combination of particular work states between workers, as a different viewpoint, the work estimation apparatus 10A may perform highlighting based on work states before and after a particular work state. For example, if there is a "transportation" action before and after a "standby" action is performed, the work estimation apparatus 10A may highlight them. The work estimation apparatus 10A may also change display of a graph based on a flow direction of a work process and an arrangement order of a plurality of workers acquired from video data.

As described above, the work estimation apparatus according to the second embodiment acquires video data on a predetermined area, estimates a work state of a worker included in the video data based on the video data, generates an analysis result by analyzing the work state of the worker, and displays display data including a graph related to the work state to which the content of the analysis result is reflected.

Therefore, the work estimation apparatus according to the second embodiment can create a statistical graph or add highlighting to a graph, so as to enable the user to make more detailed considerations than the work estimation apparatus according to the first embodiment.

(Hardware Configuration)

FIG. 15 is a block diagram illustrating a hardware configuration of a computer according to one embodiment. A computer 1500 includes a CPU (Central Processing Unit) 1510, a RAM (Random Access Memory) 1520, a program memory 1530, an auxiliary storage device 1540, and an input/output interface 1550. These elements are provided as hardware. The CPU 1510 communicates with the RAM 1520, the program memory 1530, the auxiliary storage device 1540, and the input/output interface 1550 via a bus 1560.

The CPU 1510 is an example of a general-purpose processor. The RAM 1520 is used as a working memory by the CPU 1510. The RAM 1520 includes a volatile memory such as an SDRAM (Synchronous Dynamic Random Access Memory). The program memory 1530 stores various programs including a data analysis program. As the program memory 1530, for example, a ROM (Read Only Memory), a portion of the auxiliary storage device 1540, or a combination thereof is used. The auxiliary storage device 1540 stores data in a nonvolatile manner. The auxiliary storage device 1540 includes a nonvolatile memory such as an HDD or an SSD.

The input/output interface 1550 is an interface for coupling to another device. The input/output interface 1550 is used, for example, for coupling to the storage devices 30 and 30A and coupling to the output device 40 shown in FIGS. 1 and 8. In addition, the input/output interface 1550 may be used for coupling to an input device not shown in FIGS. 1 and 8.

Each of the programs stored in the program memory 1530 includes a computer executable instruction. When the program (computer executable instruction) is loaded into the RAM 1520 and executed by the CPU 1510, it causes the CPU 1510 to execute a predetermined process. For example, when a data analysis program is executed by the CPU 1510, the CPU 1510 executes a series of processes described in relation to the steps of the flowchart of each of FIGS. 4, 5, and 8.

The program may be provided to the computer 1500 in a state of being stored in a computer-readable storage medium. In this case, for example, the computer 1500 further includes a drive (not shown) that reads data from the storage medium, and acquires the program from the storage medium. Examples of storage media include a magnetic disk, optical disks (CD-ROM, CD-R, DVD-ROM, DVD-R, etc.), magneto-optical disks (MO, etc.), and a semiconductor memory. The program may be stored in a server on a communication network such that the computer 1500 can download the program from the server by using the input/output interface 1550.

The processes described in connection with the embodiments are not limited to those which a general-purpose hardware processor such as the CPU 1510 executes according to a program, and may be performed by a dedicated hardware processor such as an ASIC (Application Specific Integrated Circuit). The term "processing circuit (processing unit)" includes at least one general-purpose hardware processor, at least one dedicated hardware processor, or a combination of at least one general-purpose hardware processor and at least one dedicated hardware processor. In the example shown in FIG. 15, the CPU 1510, the RAM 1520, and the program memory 1530 correspond to the processing circuit.

Therefore, according to each of the above embodiments, work of a worker can be estimated regardless of an observation situation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A work estimation apparatus comprising processing circuitry configured to:
   acquire video data on a predetermined area;
   estimate a work state of a worker included in the video data based on the video data; and
   output display data including a graph related to the work state,
   wherein the processing circuitry is further configured to:
   estimate the work state based on transition of positions and states of a plurality of body parts of the worker in a plurality of consecutive frames of the video data;
   estimate the positions and the states of the plurality of body parts by applying a skeleton estimation model to each of the plurality of frames; and
   estimate the work state at each time of the video data based on time-series data related to the positions and the states of the plurality of body parts,
   wherein the positions and the states of the plurality of body parts include information on at least one of an eye position, a shoulder position, an elbow position, a wrist position, a waist position, a neck bending state, and a waist bending state,
   wherein the positions and the states of the plurality of body parts include information on the wrist position, and the processing circuitry is further configured to:
   perform an area determination of whether or not the wrist position is included in a particular range in the predetermined area, and
   estimate the work state by using at least a determination result of the area determination.

2. The work estimation apparatus according to claim 1, wherein the positions and the states of the plurality of body parts include information on the eye position and the neck bending state, and the processing circuitry is further configured to:
   perform a line-of-sight determination of whether or not the worker is looking at his/her hand side based on the eye position and the neck bending state, and
   estimate the work state by using at least a determination result of the line-of-sight determination.

3. The work estimation apparatus according to claim 1, wherein the positions and the states of the plurality of body parts further include information on an ankle position and an armpit opening state, and the processing circuitry is further configured to:
   perform a state determination of whether or not the worker is in a standby state based on the ankle position and the armpit opening state, and
   estimate the work state by using at least a determination result of the state determination.

4. The work estimation apparatus according to claim 1, wherein the positions and the states of the plurality of body parts include information on the wrist position and further include information on a fingertip position, and the processing circuitry is further configured to:
  perform a holding determination of whether or not the worker is holding a tool based on the wrist position and the fingertip position, and
  estimate the work state by using at least a determination result of the holding determination.

5. The work estimation apparatus according to claim 1, wherein the processing circuitry is further configured to generate the display data based on the work state.

6. The work estimation apparatus according to claim 1, wherein the display data includes a graph tallying an operating time of the work state during a discretionary period.

7. The work estimation apparatus according to claim 6, wherein the graph is a bar graph, a pie chart, a Gantt chart, or a box plot.

8. The work estimation apparatus according to claim 7, wherein the graph is the box plot showing dispersion of the operating time of the work state.

9. The work estimation apparatus according to claim 1, wherein the processing circuitry is further configured to:
  estimate the work state of each of a plurality of workers included in the video data based on the video data; and
  generate the display data related to the work state of each of the plurality of workers.

10. The work estimation apparatus according to claim 9, wherein the processing circuitry is further configured to:
  classify actions included in the work state into three states including an operating state, an accompanying state accompanying the operating state, and a non-operating state, and
  calculate ratios of operating times of the three classified states during a discretionary period, for each of the plurality of workers.

11. The work estimation apparatus according to claim 9, wherein the display data includes a graph tallying and coordinating an operating time of the work state during a discretionary period, for each of the plurality of workers.

12. The work estimation apparatus according to claim 11, wherein the graph is a Gantt chart showing transition of the work state during the discretionary period, the work state including a plurality of work states, and the processing circuitry is further configured to:
  identify a combination of predetermined work states of the plurality of work states for each of the plurality of workers based on data of the Gantt chart, and
  highlight the identified combination in the Gantt chart.

13. The work estimation apparatus according to claim 11, wherein the graph is a Gantt chart showing transition of the work state during the discretionary period, the work state including a plurality of work states, and the processing circuitry is further configured to:
  identify a combination of predetermined work states of the plurality of work states between the plurality of workers based on data of the Gantt chart, and
  highlight the identified combination in the Gantt chart.

14. The work estimation apparatus according to claim 1, wherein the work state is at least one of parts acquisition, tool work, assembly work, walking, transportation, standby, and other work.

15. A work estimation method comprising:
  acquiring video data on a predetermined area;
  estimating a work state of a worker included in the video data based on the video data;
  outputting display data including a graph related to the work state;
  estimating the work state based on transition of positions and states of a plurality of body parts of the worker in a plurality of consecutive frames of the video data;
  estimating the positions and the states of the plurality of body parts by applying a skeleton estimation model to each of the plurality of frames; and
  estimating the work state at each time of the video data based on time-series data related to the positions and the states of the plurality of body parts,
  wherein the positions and the states of the plurality of body parts include information on at least one of an eye position, a shoulder position, an elbow position, a wrist position, a waist position, a neck bending state, and a waist bending state,
  wherein the positions and the states of the plurality of body parts include information on the wrist position, and the method further comprises:
  performing an area determination of whether or not the wrist position is included in a particular range in the predetermined area, and
  estimating the work state by using at least a determination result of the area determination.

16. A work estimation apparatus comprising processing circuitry configured to:
  acquire video data on a predetermined area;
  estimate a work state of a worker included in the video data based on the video data; and
  output display data including a graph related to the work state,
  wherein the processing circuitry is further configured to:
  estimate the work state based on transition of positions and states of a plurality of body parts of the worker in a plurality of consecutive frames of the video data;
  estimate the positions and the states of the plurality of body parts by applying a skeleton estimation model to each of the plurality of frames; and
  estimate the work state at each time of the video data based on time-series data related to the positions and the states of the plurality of body parts,
  wherein the positions and the states of the plurality of body parts include information on at least one of an eye position, a shoulder position, an elbow position, a wrist position, a waist position, a neck bending state, and a waist bending state,
  wherein the positions and the states of the plurality of body parts include information on the wrist position and further include information on a fingertip position, and the processing circuitry is further configured to:
  perform a holding determination of whether or not the worker is holding a tool based on the wrist position and the fingertip position, and
  estimate the work state by using at least a determination result of the holding determination.

17. The work estimation apparatus according to claim 16, wherein the positions and the states of the plurality of body parts include information on the eye position and the neck bending state, and the processing circuitry is further configured to:
  perform a line-of-sight determination of whether or not the worker is looking at his/her hand side based on the eye position and the neck bending state, and
  estimate the work state by using at least a determination result of the line-of-sight determination.

18. The work estimation apparatus according to claim 16, wherein the positions and the states of the plurality of body parts further include information on an ankle position and an armpit opening state, and the processing circuitry is further configured to:

perform a state determination of whether or not the worker is in a standby state based on the ankle position and the armpit opening state, and estimate the work state by using at least a determination result of the state determination.

19. The work estimation apparatus according to claim 16, wherein the processing circuitry is further configured to generate the display data based on the work state.

20. The work estimation apparatus according to claim 16, wherein the display data includes a graph tallying an operating time of the work state during a discretionary period.

21. The work estimation apparatus according to claim 20, wherein the graph is a bar graph, a pie chart, a Gantt chart, or a box plot.

22. The work estimation apparatus according to claim 21, wherein the graph is the box plot showing dispersion of the operating time of the work state.

23. The work estimation apparatus according to claim 16, wherein the processing circuitry is further configured to:

estimate the work state of each of a plurality of workers included in the video data based on the video data; and generate the display data related to the work state of each of the plurality of workers.

24. The work estimation apparatus according to claim 23, wherein the processing circuitry is further configured to:

classify actions included in the work state into three states including an operating state, an accompanying state accompanying the operating state, and a non-operating state, and calculate ratios of operating times of the three classified states during a discretionary period, for each of the plurality of workers.

25. The work estimation apparatus according to claim 23, wherein the display data includes a graph tallying and coordinating an operating time of the work state during a discretionary period, for each of the plurality of workers.

26. The work estimation apparatus according to claim 25, wherein the graph is a Gantt chart showing transition of the work state during the discretionary period, the work state including a plurality of work states, and the processing circuitry is further configured to:

identify a combination of predetermined work states of the plurality of work states for each of the plurality of workers based on data of the Gantt chart, and highlight the identified combination in the Gantt chart.

27. The work estimation apparatus according to claim 25, wherein the graph is a Gantt chart showing transition of the work state during the discretionary period, the work state including a plurality of work states, and the processing circuitry is further configured to:

identify a combination of predetermined work states of the plurality of work states between the plurality of workers based on data of the Gantt chart, and highlight the identified combination in the Gantt chart.

28. The work estimation apparatus according to claim 16, wherein the work state is at least one of parts acquisition, tool work, assembly work, walking, transportation, standby, and other work.

29. A work estimation method comprising:

acquiring video data on a predetermined area;

estimating a work state of a worker included in the video data based on the video data;

outputting display data including a graph related to the work state;

estimating the work state based on transition of positions and states of a plurality of body parts of the worker in a plurality of consecutive frames of the video data;

estimating the positions and the states of the plurality of body parts by applying a skeleton estimation model to each of the plurality of frames; and estimating the work state at each time of the video data based on time-series data related to the positions and the states of the plurality of body parts, wherein the positions and the states of the plurality of body parts include information on at least one of an eye position, a shoulder position, an elbow position, a wrist position, a waist position, a neck bending state, and a waist bending state, wherein the positions and the states of the plurality of body parts include information on the wrist position and further include information on a fingertip position, and the method further comprises:

performing a holding determination of whether or not the worker is holding a tool based on the wrist position and the fingertip position, and estimating the work state by using at least a determination result of the holding determination.

\* \* \* \* \*